DUAL MODE TELEVISION SIGNAL SYNCHRONIZER PHASE LOCK LOOP

Filed May 8, 1967 4 Sheets-Sheet 1

INVENTOR.
WALTER H. BOCKWOLDT,
BY
Robert Thompson
ATTORNEY.

July 28, 1970 W. H. BOCKWOLDT 3,522,373

DUAL MODE TELEVISION SIGNAL SYNCHRONIZER PHASE LOCK LOOP

Filed May 8, 1967 4 Sheets-Sheet 3

DUAL MODE TELEVISION SIGNAL SYNCHRONIZER PHASE LOCK LOOP

United States Patent Office 3,522,373
Patented July 28, 1970

3,522,373

DUAL MODE TELEVISION SIGNAL SYNCHRONIZER PHASE LOCK LOOP

Walter H. Bockwoldt, Woodland Hills, Calif., assignor to Hughes Aircraft Company, Culver City, Calif., a corporation of Delaware Filed May 8, 1967, Ser. No. 636,695
Int. Cl. H04n 5/76, 5/78
U.S. Cl. 178—6.6 12 Claims

ABSTRACT OF THE DISCLOSURE

A synchronizer circuit connected to receive a vertical sync signal and a horizontal sync signal of a television signal during an encoding mode of operation for generating a tone burst signal, a horizontal sync signal, a vertical sync signal and a sample or pilot signal for encoding the video signal, all in synchronism with one another; or on decode operation being coupled to receive the sample or pilot signal for generating a horizontal sync signal, a vertical sync signal and a sampling sync signal, all in synchronism with one another for decoding and reconstructing the encoded video signal.

This invention relates generally to improvements in a synchronizer adapted to be used with a video tape recorder, and more particularly, to the dual mode synchronizer which is operable during a signal encoding operation or during a signal decoding operation.

In the television technology, it is sometimes desirable to reduce the bandwidth requirements of a television signal in order to make the signal compatible with the bandwidth limitations of some other medium such as a video tape recorder, while at the same time not seriously affecting the time-base stability requirements of the signal. One way to reduce the bandwidth requirements is to take advantage of the redundancy in the frame-to-frame video information and the ability of the human sight process to fill in missing information. In this regard, in copending patent application S.N. 563,763, entitled "Television Bandwidth Reduction," filed July 8, 1966 by Russell R. Law, a system is disclosed in which the video information is sampled and recorded in a select, evenly-spaced stable pattern that recurs every "X" lines. This sampled information is further divided into complementary sets of data, with each separate complementary set being recorded on a separate channel. For example, if two complementary sets of data were sampled, they would be recorded on two channels; and if four complementary sets of data were sampled, they would be recorded on four channels, etc.

Accordingly, it is an object of this invention to provide an improved synchronizer which is adapted to be utilized in the above type of circuit.

Another object is to provide an improved synchronizer which is operable to affect time-base stabilized encoding of an electrical signal such as a video signal.

Still another object is to provide an improved synchronizer which is operable to affect time-base stabilized decoding of an encoded electrical signal such as a video signal.

Yet another object is to provide a dual mode synchronizer which, in a first mode, will affect encoding of a video signal, and in a second mode, affect decoding of a video signal.

Other objectives of this invention can be attained in a system of the type having an encoder which samples a television luminance signal (Y in a stable pattern, characterized by evenly-spaced sampled data that is continually repeated, and which selects or conducts, line-by-line, only two of the three color or chrominance signals (R—Y) and (B—Y). The sampled bits of luminance data and the chrominance data are fed through a plurality of parallel channels to a recorder which is operably coupled for recording the sampled and selected data on a plurality of parallel recording channels. A decoded is operably coupled to the recorder for receiving played-back sampled data on a plurality of parallel channels and is operable to recombine the played-back data into a reconstructed video signal.

A synchronizer is coupled to the encoder and decoder and is operable to receive the horizontal sync signal $f_h$ and vertical sync signal $f_v$ from a television receiver and generates a horizontal sync signal $f_h$, a vertical sync signal $f_v$, a tone burst signal $22f_h$, and a sampling sync signal $f_s$, all of which are synchronized and provide time-base stability in the sampled video signal. To sample the video signal, a sampling signal is derived from the sampling sync signal so that the luminance portion thereof, (—Y), is sampled in the stable recurring pattern, the chrominance portion thereof (R—Y) and (B—Y) are sampled on a line-by-line basis in response to the generated horizontal sync signal $f_h$. In addition, the vertical sync signal $f_v$ is replaced with the tone burst signal $22f_h$ when recorded. In addition, the sampling sync signal $f_s$ can be reduced in frequency and recorded as a pilot signal P.

On the playback or decode mode of operation, the synchronizer is connected to receive the played-back pilot signal P from the recorder and generates in response thereto a sampling sync signal $f_s$, a horizontal sync signal $f_h$, a vertical sync signal $f_v$, which are fed to the decoder for reconstructing the played-back sampled and selected video information in a manner so that the sampled bits of luminance information and the selected chrominance information are fed to the television receiver as a composite picture for viewing.

Other objects, features and advantages of this invention will become apparent upon reading the following detailed description and referring to the accompanying drawings, in which:

FIG. 1 is a block diagram of a video tape recorder system showing the relationship of the color television receiver, the encoder, the recorder, and the decoder to the synchronizer;

FIGS. 2*a* through 2*c* are graphical illustrations showing a sampling pattern of a portion of a video picture, in which individual information bits are illustrated as rectangles with the subscript indicating the sequence of sampling and the chrominance information is illustrated as a wavy line;

Figure 1:
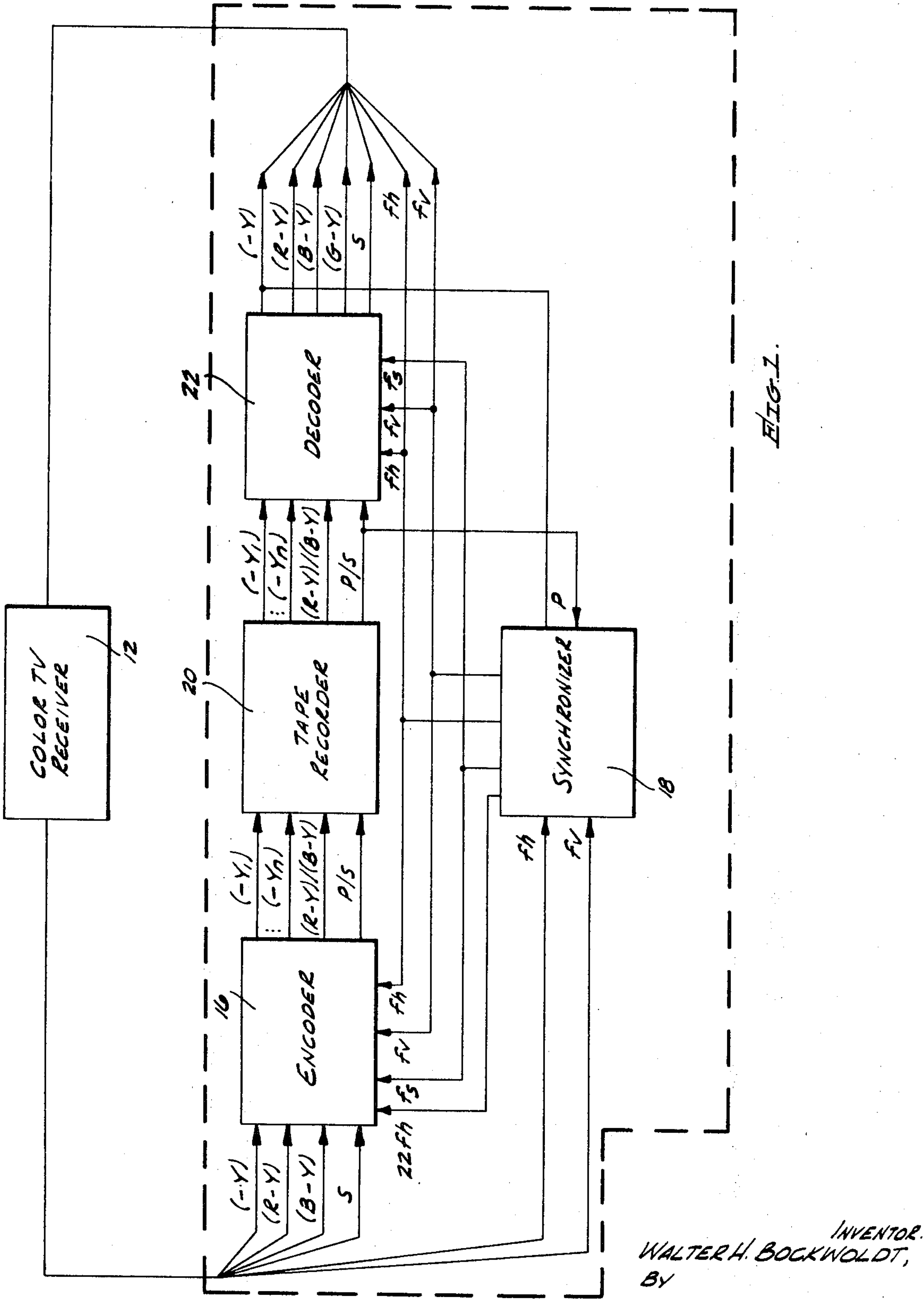

Referring now to the VTR (video tape recorder) system with which the synchronizer can be used, FIG. 1 illustrates the operational relationship between a color television receiver 12 and a video tape recorder system 14, which incorporates the synchronizer 18 as a portion thereof. The video tape recorder system 14 includes an encoder 16 which is coupled to receive the luminance signal (—*Y*) and the chrominance signals (*R*—*Y*) and (*B*—*Y*) from a convenient tap point in the television receiver 12. The encoder 16 can be selectively controlled by output signals from the synchronizer 18 for sampling the luminance signal (—*Y*) in accordance with the sampling pattern graphically illustrated in FIG. 2*a*, and for selecting the chrominance signal in accordance with line-by-line switching pattern graphically illustrated in FIG. 2*b*.

In the encoding mode of operation, the luminance signal ($-Y$) received by the encoder 16 is sampled in a stable recurring pattern in response to a sample signal derived from the sampling sync signal $f_s$ generated by the synchronizer 18. For example, the sampled luminance signal is fed on a plurality of parallel output channels as sampled luminance data $-Y_1$ through $-Y_n$ where $n$ is a number such as 2 or more, to a recorder 20 such as a magnetic tape recorder. In addition, the red chrominance signal ($R-Y$) and blue chrominance signal ($B-Y$), but not the green chrominance signal ($G-Y$), are switched or selected on a horizontal video line-by-line basis in response to the horizontal sync signal $f_h$ generated by the synchronizer 18 so that they can be sequentially recorded on a single track of the recorder 20. In addition, the vertical sync signal $f_v$ normally associated with the very first line of each video field is replaced with a tone burst signal 22$f_h$ which in this particular embodiment is 22 times the frequency of the horizontal sync signal so that it can be readily identified on the playback or decode mode of operation of the video tape recorder.

Before describing the decoding mode of operation of the circuit in FIG. 1, a particular sampling pattern which includes two complementary sets of sampled luminance data ($-Y_1$) and ($-Y_2$), will be briefly described in order to clarify the operational characteristics of the synchronizer 18 to the encoder 16 and decoder 22.

Figure 2A:
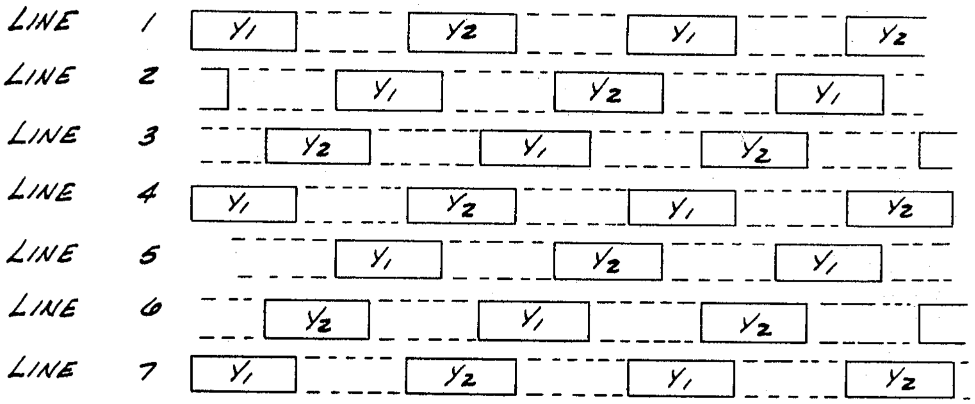

The specific luminance sampling pattern developed by the described circuit is graphically illustrated in FIG. 2*a* as representative of a portion of one video picture or frame. In practice, during the odd-numbered video fields, selected, evenly-spaced luminance information areas are sampled in the sequence $Y_1$, $Y_2$, wherein the subscript represents the sequence in sampling. For example, each sampled data area is illustrated as a rectangular area containing the reference characters $Y_1$ or $Y_2$. There can be 40⅓ sampled data areas on each video line and the sampling pattern repeated every X (three) lines. The encoder, in response to a sample signal derived from the sampling sync signal $f_s$ generated by the synchronizer 18, processes the $Y_1$ sampled data signals always onto a first output channel and the $Y_2$ sampled data signal onto a second output channel.

On playback, the luminance information is decoded and recombined on a single output channel as a composite luminance signal in the same order as illustrated in FIG. 2*a* and is used to modulate the cathode ray tube in the television receiver 12.

It should, of course, be understood that the complementary sets of sampled data are not limited to two sets but can include additional sets. Under these conditions, each set of sampled data $Y_1$ through $Y_n$ preferably would be positioned symmetrically in time and space relative to adjacent sets of sampled data, would be processed onto separate sampling channels, and would be applied to the recorder 20 for recording on separate parallel recording tracks.

The encoder 16 also receives chrominance signals from the color television receiver 12 and processes them for recording on a single track in the tape recorder 20. Since the NTSC color signal has the advantage that the green signal ($G-Y$) may be derived from the red signal ($R-Y$) and the blue signal ($B-Y$), the green signal ($G-Y$) is not recorded. In operation, the red signal ($R-Y$) and the blue signal ($B-Y$) are applied to the encoder from a convenient tap point in the receiver 12. The encoder alternately selects and conduits the red signal ($R-Y$) and then the blue signal ($B-Y$) in a continuous sequence so that the red signal ($R-Y$) is conducted during every second horizontal video line and the blue signal ($B-Y$) is conducted during every intermediate horizontal video line therebetween, as graphically illustrated in FIG. 2*b*. This switching from color to color on a line-by-line basis is continued for each field. Of course, other than a full line of color information can be selected as long as the gating times are equal and the color information is also delayed for one line when utilized to reconstruct the green signal ($G-Y$). The selected chrominance information is fed to the recorder 20, where it is recorded on a single track.

Figure 2B:
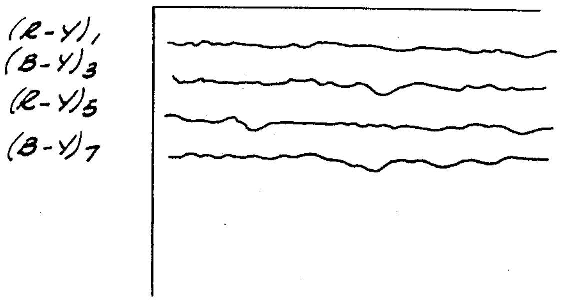
Figure 2C:
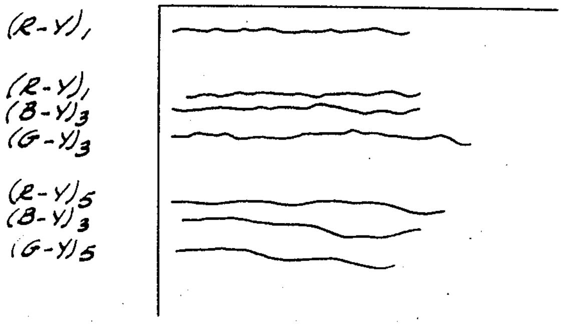

The played-back chrominance signals $(R-Y)/(B-Y)$ are sequentially fed to the decoder 22 and processed in accordance with a switching operation in response to the horizontal sync signal $f_h$ and the vertical sync signal $f_v$ derived from the played-back pilot signal P by the synchronizer 18 to reconstruct the chrominance signal in the manner illustrated in FIG. 2*c*. In operation, the red chrominance signal ($R-Y$) and the blue chrominance signal ($B-Y$) are selectively switched within the decoder onto a separate red channel (R—Y), a separate blue chanel (B—Y), respectively, and are combined in a manner described in the previously referenced U.S. patent application S.N. 563,763 for recreating a green color signal ($G-Y$) which is fed onto a separate green channel ($G-Y$). These processed chrominance signals are fed to modulate the control grid of a color cathode ray tube in the color television receiver 12.

The sound or audio signal S and a clock or pilot signal P are both recorded on the same recording track of recorder 20. In practice, the audio signal S received from the receiver 12 is mixed with the pilot signal P which is derived from the sampling signal $f_s$, thereby forming a combined signal *P/S* that is recorded on a single recording track within the tape recorder 20. Since the pilot signal P is recorded at fixed tape positions relative to the positions of the recorded luminance information and the recorded chrominance information, the time-base of the recorded video information is stabilized or fixed by the tape itself. As a result, the effects of time-base instability in the recording medium is significantly reduced.

The synchronizer 18, as illustrated in FIG. 1, is coupled to receive a base frequency signal such as the horizontal sync signal $f_h$ (15.75 kHz.) during the encoding or recording mode and to receive the played back clock sync signal P during the decoding or playback mode. The mode of operation of the synchronizer can be selectively switched between the encoder operation and the decoder operation, as will be explained in more detail with reference to FIG. 3.

Figure 3:
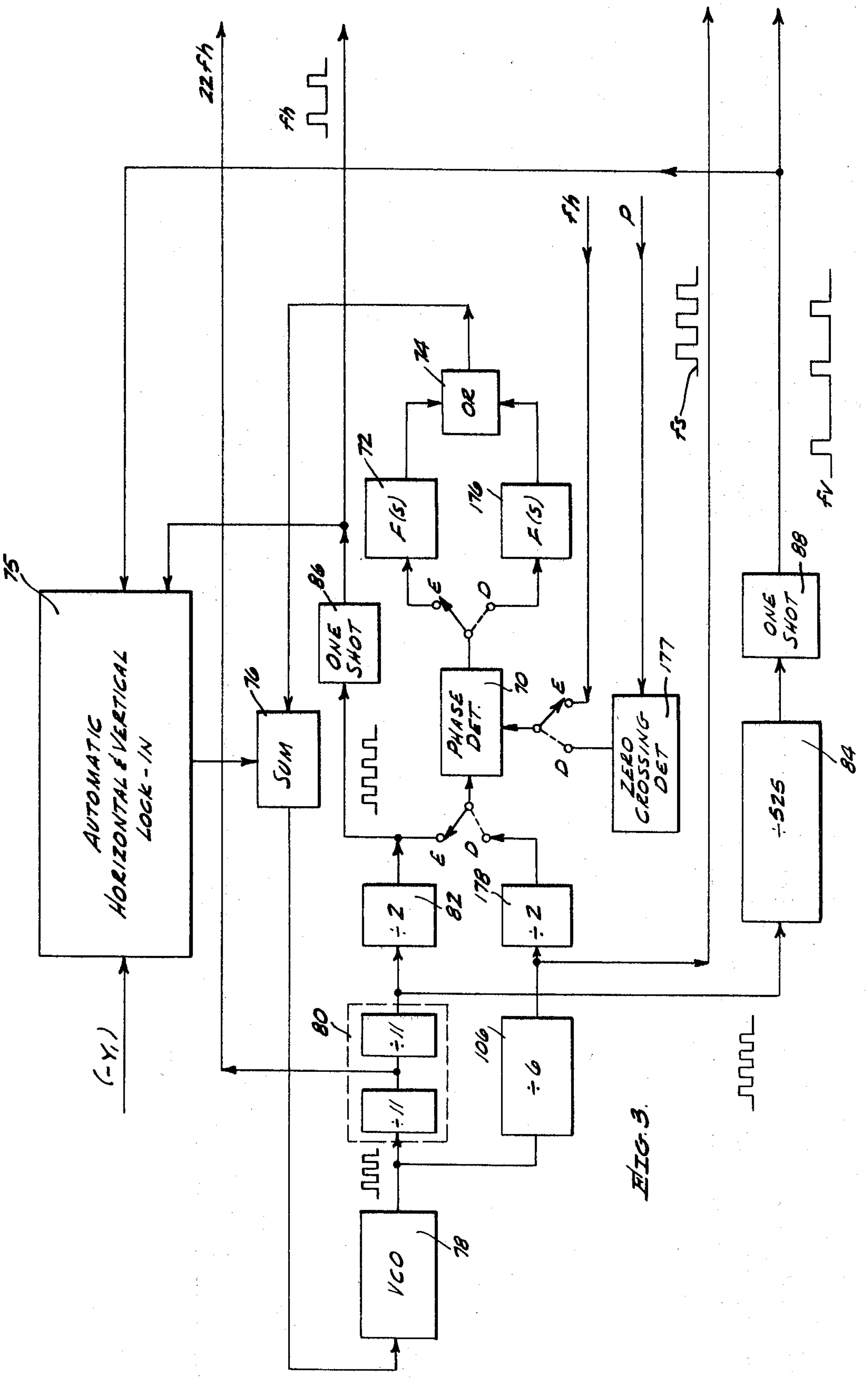
FIG. 3 is a block diagram of the synchronizer embodying features of this invention.

The synchronizer 18, is illustrated in block diagram form in FIG. 3, includes a phase detector 70 which is operably switched between a first phase-lock loop associated with the encoding mode of operation when the poles of the switched inputs and outputs are connected to the terminal marked E or to a phase-lock loop associated with the decoding mode of operation when the poles are switched into contact with the switch terminals marked D.

In describing the operation of the synchronizer illustrated in FIG. 3 in detail, reference will first be made to its encode mode of operation and then to its decode mode of operation.

During the encoding operation, a phase detector 70 phase-compares the phase of the horizontal sync signal $f_h$ received from the television receiver 12 with a horizontal sync signal $f_h$ generated by the phase-lock loop circuit. More specifically, the generated horizontal sync signal $f_h$ is produced by a circuit that includes a lead-lag network 72 coupled to receive the output signal from phase detector 70 and operable to stabilize the phase-lock loop. The output from the lead-lag circuit 72 is applied to an OR gate 74 which is operable to conduct a signal from either portion of the phase-lock loop, during either mode of operation, to a summing circuit 76, as will be explained more fully shortly. The output from the summing circuit 76 is applied to a voltage-controlled oscillator 78 which generates an output signal having a nominal frequency which is particularly advantageous for obtaining a unique sampling pattern such as is described with reference to FIGS. 2*a*–2*c*. The output from the voltage-controlled oscillator 78 is applied to a ÷121 circuit 80 that includes two series-connected ÷11 circuits which reduce the frequency of the output signal from the voltage-controlled oscillator 78 to a frequency from which the generated horizontal sync pulse $f_h$ can be obtained by means of a further division at a ÷2 circuit 82 and in addition, the vertical sync signal $f_v$ can be derived from the output signal of the voltage-controlled oscillator 78 and ÷121 circuit 80 by a further frequency reduction such as by means of a ÷525 circuit 84. The generated horizontal sync signal $f_h$ received from the ÷2 circuit 82 is also converted to an output pulse signal by a one-shot multivibrator 86, and the generated vertical sync signal $f_v$ received from the ÷525 circuit 84 is converted to an output pulse signal by a one-shot multivibrator 88. The generated horizontal sync signal $f_h$ from the ÷2 circuit 82 is also phase-compared at the phase detector 70 with the horizontal sync signal $f_h$ received from the television receiver to maintain the generated horizontal sync signal $f_h$ in phase with the received horizontal sync signal $f_h$. In addition, the ÷121 circuit is tapped to provide a tone burst output signal 22$f_h$ which is fed to the encoder.

Figures 4, 5A, 5B, 5C:
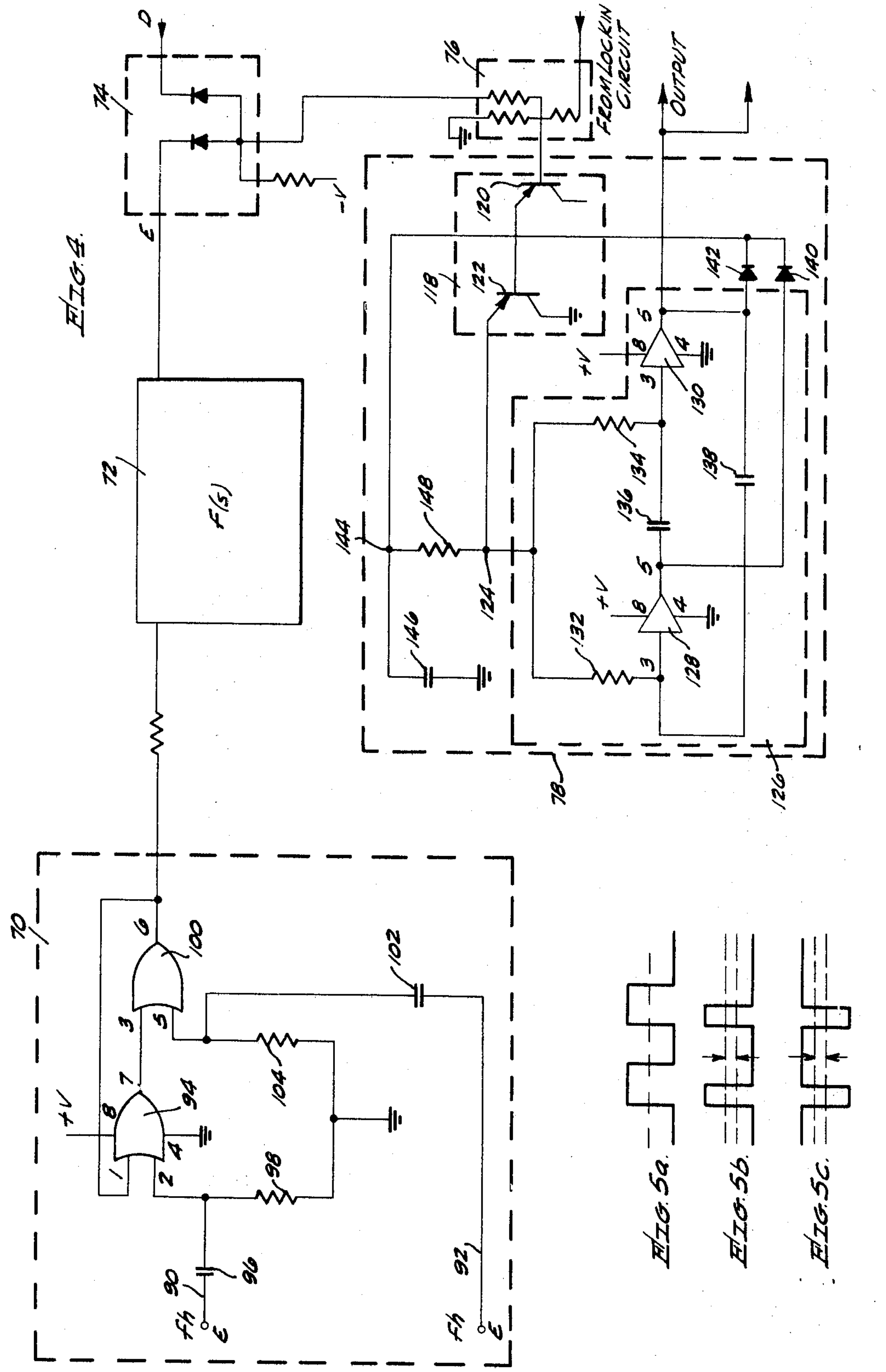
FIG. 4 is a circuit diagram illustrating in detail portions of the synchronizer circuit of FIG. 3.
FIGS. 5*a* through 5*c* are graphs illustrating the output signal waveforms of the phase detector in FIG. 3.

More specifically, as illustrated in FIG. 4, the phase detector 70 receives the horizontal sync signal $f_h$ from the television receiver 12 at a first E input terminal 90, and the generated horizontal sync signal $f_h$ at a second E input terminal 92 and generates an output pulse signal having an average voltage relative to a reference voltage which is representative of the phase difference between the two input signals.

Structurally, the phase detector 70 includes a pair of gating stages, each having two input terminals such as a "μL–914," manufactured by the Fairchild Semiconductor Co., and described and illustrated in their brochure SL–66, published in August 1965. For purposes of simplifying the description, the numerical terminal connections for the "μL–914" and other μL circuits, to be described, are identified by the reference numerals adjacent the connecting leads.

In operation, the horizontal sync signal $f_h$ from television receiver 12 is fed to one input of a gating stage 94 through a coupling capacitor 96. In addition, the input lead also has a resistor 98 connected thereto and shunted to ground to cause the gating stage 94 and a gating stage 100 to operate as multivibrator stages. The second gating stage 100 is coupled to receive the generated horizontal sync signal $f_h$ from the second E input terminal 92 through a coupling capacitor 102. In addition, a resistor 104 is shunted between the input lead and a ground reference terminal to cause the gating stage 100 to operate as a multivibrator stage. The second input terminal to the second gating stage 100 is connected to receive the output signal from the first gating stage 94. In addition, the output terminal of the second gating stage 100 is fed back to a second input terminal on the first gating stage 94. Thus, the two gating stages are cross-coupled In operation, if the two input signals of the phase detector 70 are in phase, the output signal will be a square wave pulse having a waveform of the type graphically illustrated in FIG. 5*a* wherein the pulses are symmetrical about a reference voltage level indicated by the dashed line. If, however, the two input signals are out of phase in one direction, the pulse waveform becomes asymmetrical about the reference level wherein the voltage of the output signals becomes negative relative to the reference signal, as indicated by the two dashed lines in FIG. 5*b*. Conversely, if the input signals vary in phase in an opposite direction, the phase detector 70 generates an output signal which is also asymmetrical about the reference level as indicated by the two dashed lines in FIG. 5*c* and has an average voltage that is positive relative to the reference level.

The lead-lag network 72 receives the output signal from the phase detector 70 and filters out the AC component to produce a DC average voltage while stabilizing the phase-lock loop. One type of circuit that will readily perform this operation is described and illustrated in Television Engineering Handbook, first ed., published 1957 by McGraw-Hill Book Co., and edited by Donald G. Fink, on pp. 16–136 through 16–142.

The filtered DC signal is then fed through one diode of the OR gate 74. As will be explained subsequently, the other diode is operable to receive a signal during the decoder operation.

The output from OR gate 74 is fed through a resistor branch of the summing network 76 to the input of the voltage-controlled oscillator 78. As is explained in more detail in the previously reference copending U.S. patent application S.N. 563,763, the other input to the summing network 76 is received from the automatic lock-in circuit 75 during the decoding mode of operation.

The voltage-controlled oscillator 78 receives the DC signal and generates an output signal at terminal 116 having a frequency related to the voltage level of the incoming DC signal. Structurally, the voltage-controlled oscillator includes an input buffer amplifier 118 having a pair of cascaded emitter-follower transistors 120 and 122 in which the base terminal of the first stage emitter-follower transistor receives the incoming DC signal and is forwad base biased. The resulting emitter current change in transistor 120 forward base biases transistor 122 and results in an emitter current flow that develops a control signal at terminal 124 which, in turn, sets or controls the operation of an astable multivibrator 126.

The astable multivibrator 126 includes a first gating stage amplifier 128 and a second gating stage amplifier 130 which are coupled to receive the DC control signal from the control terminal 124 through resistors 132 and 134, respectively. The gating stages are substantially identical to the "μL–900," manufactured by the Fairchild Semiconductor Co., and described and illustrated in their publication SL–66, dated August 1965. In addition, the output of gating stage 128 is also cross-coupled to the input terminal of gating stage 130 through timing capacitor 136, and the output of gating stage 130 is cross-coupled to the input terminal of gating stage 128 through a timing capacitor 138. As a result of this cross-coupling, the gating stages 128 and 130 operate alternately, such that when gating stage 128 is conducting, gating stage 130 is nonconducting, and vice versa.

In operation, a change in the voltage level at control terminal 124 varies the frequency at which the astable multivibrator 126 operates. For example, an increase in the voltage at control terminal 124 decreases the charging time of the capacitors 136 and 138, causing the frequency of the output signal at output terminal 116 to increase. Conversely, a decrease in the control voltage at terminal 124 results in a decrease in the frequency of the output signal at terminal 116.

The outputs of the gating stages 128 and 130 of the astable multivibrators are also coupled through alternately conducting diodes 140 and 142, respectively, to take out the AC component which would normally result from the alternating operation of the gating stages 128 and 130. When the diodes 140 and 142 conduct, they set a positive DC voltage at terminal 144, wherein any AC component contained therein is filtered to a ground or reference potential through a capacitor 146. The resulting positive DC voltage signal at terminal 144 sets up a current through the resistor 148 to supply bias voltage and a current for the buffer amplifier 118. This circuit aids reliable self-starting of the voltage-controlled oscillator since both amplifier 128 and amplifier 130 cannot be on simultaneously.

The output signal from the voltage-controlled oscillator 78 is frequency stabilized at about 3811.5 kHz. and is split into two circuit branches, one of which is used to generate the horizontal sync signal $f_h$, and a vertical sync signal $f_v$, and the other of which is used to generate a sampling sync signal $f_s$.

Referring back to FIG. 3, the circuit for generating the horizontal sync signal $f_h$ and the vertical sync signal $f_v$ includes a ÷121 circuit 80 which is coupled to receive the output signal from the voltage-controlled oscillator 78. The ÷121 circuit 80 can be constructed by conventional components such as two ÷11 counters connected in series. Counters of this type are described in the Fairchild Semiconductor Co.'s Application Bulletin APP–120, entitled "Using JK Flip-Flops in Small Module Counters," dated January 1966. The particular "JK Flip-Flop" stages can be the "μL–923 JK Flip-Flop" manufactured by the Fairchild Semiconductor Co. and described and illustrated in their brochure dated May 1965.

To obtain the generated horizontal sync signal $f_n$ which should have the same frequency (15.75 kHz.) and be in phase with the horizontal sync signal $f_h$ received from the television receiver 12, the output from the ÷121 circuit 80 is fed to a ÷2 circuit 82 can be a bistable multivibrator such as the previously referenced "μL–923 JK Flip-Flop" manufactured by Fairchild Semiconductor Co. In operation, the output from the ÷121 circuit 80 toggles or switches the output state of the flip-flop to effectively obtain a division by 2. The output from the ÷2 circuit 82 is divided into two parallel circuit branches from where it is fed to one E input terminal of the phase detector 70 and to a one-shot multivibrator 86, respectively. As illustrated more specifically in FIG. 4, the feedback signal is applied to the E input terminal 92 and is utilized to trigger the second gating stage 100 of the phase detector 70, as previously explained.

The output from the ÷2 circuit 82 is also applied to the one-shot multivibrator 86 to generate the horizontal sync pulses $f_n$ (15.75 kHz.) which are utilized to control a portion of the operation of the encoder and decoder, as is explained in more detail in the previously referenced copending U.S. patent application S.N. 563,763. Structurally, the one-shot multivibrator 86 can be of the type including the previously referenced "μL–914" circuit, manufactured by the Fairchild Semiconductor Co.

The tone burst signal $22f_h$ is derived from a convenient tap point in the ÷121 circuit 80, such as between the two ÷11 stages, whereupon the tone burst signal $22f_h$ is fed back to the luminance channel to replace the vertical sync signal $f_v$, as previously described with reference to FIG. 1.

In addition, the vertical sync signal $f_v$ (60 Hz.) is derived by taking the output of the ÷121 circuit 80 and further dividing it by means of a ÷525 circuit 84. The ÷525 circuit 84 can be constructed by using the JK Flip-Flops and combining them in the manner explained in the previously referenced Application Bulletin APP–120. For example, the ÷525 circuit could be constructed by including in series a ÷3, a ÷5, and a ÷7 counter. The output from the ÷525 circuit 84 is at a frequency of 60 Hz. and is fed to the one-shot multivibrator 88, where it is converted to an output pulse signal.

The sampling sync signal $f_s$ at 635.25 kHz, is derived from the output of the voltage-controlled oscillator 78 by means of a ÷6 circuit 106. Structurally, the ÷6 circuit 106 can include a ÷3 counter connected in series with a ÷2 counter in the manner explained in the previously referenced Application Bulletin APP–120. The output sampling sync signal $f_s$ from the ÷6 circuit 106 is a pair of complementary output signals which are alternately high and low relative to one another as is conventional with JK flip-flop. These sampling sync signal outputs $f_s$ from the ÷6 circuit are utilized to control the operation of the gating or the sampling pulse train generators located within the encoder 16 and to derive a pilot frequency signal P which is recorded on a separate parallel track. The sampling sync signal $f_s$ fed to the encoder 16 controls the operation thereof to attain the luminance sampling pattern illustrated in FIG. 3*a*. Of course, for other sampling patterns, other division circuits could be used.

Since the pilot signal P and the sampling signals are derived from the same time-base frequency signal (sampling sync signal $f_s$), their time base relative to one another is substantially invariable. Thus, any time-base instability in the recording medium will not affect the time-base stability of the sampled video information $(-Y_1)$ and $(-Y_2)$ relative to the pilot signal P.

The output signals from the synchronizer 18 are then fed to the encoder 16 wherein the encoding operation graphically illustrated in FIGS. 2*a* and 2*b* is performed.

The synchronizer illustrated in FIG. 4 is operably changed to the decoder mode of operation by switching the inputs and the outputs of the phase detector 70 from the E terminal connections to the D terminal conections, as indicated by the dashed lines. In operation, phase detector 70 receives the played back pilot signal P and a generated corresponding pilot signal P, whereupon the phase-compared output of the phase detector 70 is fed to a lead-lag network 176 which stabilizes the operation of the phase-lock lop and filters out the AC components of the phase detector output. The output from the lead-lag circuit 176 is fed to one input diode of the OR gate 174 (FIG. 4) and thence to the summing network 76.

In addition, an output signal from the automatic lock-up circuit 75 is fed to the summing network 76 if the played back video signal is out of horizontal and vetrical sync, as is explained in more detail in copending U.S. patent application Ser. No. 563,763. The output from the summing network 76 is fed to the voltage-controlled oscillator 78 which, as previously stated, is operable to generate an output signal having a frequency of about 3811.5 kHz. when stabilized. The generator pilot signal P fed to the phase detector 70 is developed in the portion of a phase lock loop containing a ÷6 circuit 106 and a ÷2 circuit 178. The ÷6 circuit 106 and the ÷2 circuit 178 are constructed from JK flip-flops in the previously explained manner. At the phase detector 70, the generated pilot signal P is phase-compared with the played back pilot signal P of about 317.6 kHz. received from the tape recorder 20.

The played back pilot signal P is fed through a zero cross detector 177 which changes the voltage level of the output each time the voltage level of the received clock signal P crosses the zero voltage or threshold level. One circuit that will perform this operation is "μA–710 High-Speed Differential Comparator," manufactured by the Fairchild Semiconductor Co., and described and illustrated in their corresponding brochure dated March 1965.

Once the phase-lock loop is stabilized, the horizontal sync output signal $f_h$ from the one-shot multivibrator 86 has a frequency of 15.75 kHz., the vertical sync output signal $f_v$ generated by tre one-shot multivibrator 88 has a frequency of 60 Hz., and the sampling sync output signal $f_v$ generated by the one-shot multivicircuit 106 has a frequency of 635.25 kHz. These output signals are then fed to the decoder 22 wherein the decoding operation, graphically described in FIGS. 2*a* through 2*c* is performed.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. In a video tape recorder system of the type including a television receiver, an encoder for encoding the received vido information, a recorder for recording the encoded video information, and a decoder for decoding played back video information, and a synchronized comprising:

signal generator means for generating an output signal in response to a signal fed thereto, the output signal being frequency variable relative to a nominal frequency;

means responsive to the output signal from said signal generator means for generating a horizontal sync signal and a sampling sync signal in response thereto, the generated signals to be fed to the encoder and the decoder;

detector means in a first mode of operation being coupled to receive the horizontal sync signal from the receiver and to receive the generated horizontal sync signal for comparing the difference therebetween and generating an output signals related to the difference;

means coupled between said detector means and said signal generator means to produce and conduct a signal related to the output signal of said detector means to said signal generator means for varying the frequency of the output signal or said signal genertor means in response to the output signal from said detector means for maintaining the phase difference between the generated horizontal sync signal and the received horizontal sync signal;

switch means coupled to said detector means for switching it from the above mode of operation to a second mode of operation;

said means responsive to the output signal from said signal generator means being operable to provide a generated frequency signal related to the sampling signal;

said detector being coupled to receive from the recorder a played back signal related to the sampling signal of the encoding mode of operation and being coupled to receive a generated output signal from said means responsive to the output signal from said signal generator means, through said switch means the generated output signal having a nominal frequency equal to the frequency of the played back signal for generating an output signal related to the phase difference between the two received signals; and said means connected between said phase detector and said signal generator means is operable for feeding the output signal from said phase detector to said signal generator means for varying the frequency of the output signal of said signal generator means in relation to the phase difference between signals received by said phase detector for minimizing the phase difference therebetween.

2. The system of claim 1 in which said means responsive to the output from said signal generator means is further operable for generating a vertical sync signal in the first mode of operation to be fed to the encoder.

3. The system of claim 2 in which said means responsive to the output signal from said signal generator means is further operable for generating a tone burst signal in the first mode of operation to be fed to the encoder.

4. The system of claim 1 in which said means responsive to the output signal from said signal generator means is further operable for generating a tone burst signal in the first mode of operation to be fed to the encoder.

5. The system of claim 1 in which: said signal generator means is a voltage-controlled oscillator;

said means responsive to the output signal from said signal generator means is a frequency divider circuit;

said detector means is a phase detector; and said means coupled between said detector means and said signal generator means includes filter means for producing a DC signal having an instantaneous amplitude related to the phase difference between the generated horizontal sync signal and the received horizontal sync signal.

6. The system of claim 1 in which said means responsive to the output signal from said signal generator means is further operable for generating a horizontal sync signal in the second mode of operation.

7. The system of claim 6 in which said means responsive to the output signal from said signal generator means is further operable for generating a horizontal sync signal in the second mode of operation.

8. The system of claim 1 in which said means responsive to the output signal from said signal generator means is further operable for generating a vertical sync signal in the second mode of operation.

9. The system of claim 1 in which said signal generator means is a voltage-controlled oscillator;

said means responsive to the output signal from said signal generator means is a frequency divider circuit;

said detector means is a phase detector; and said means coupled between said detector means and said signal generator means includes filter means for producing a DC signal having an instantaneous amplitude related to the phase difference between the generated horizontal sync signal and the received horizontal sync signal.

10. In a video tape recorder system of the type including a television receiver, a recorder for recording encoded video information, and a decoder for decoding the recorded video information, a synchronizer comprising:

signal generator means for generating an output signal in response to a signal fed thereto, the output signal being variable relative to a nominal frequency;

means coupled to receive the output signal from said signal generator means for generating a horizontal sync signal and a signal related to a sampling signal in response thereto;

detector means coupled to receive from the recorder a played back signal related to the sampling signal and coupled to receive the corresponding generated signal from said means responsive to the output signal from said signal generator means for generating an output signal related to the phase difference between the received signals; and means connected between said phase detector and said signal generator means for feeding a signal derived from the output signal from said phase detector to said signal generator means for varying the frequency of the output signal of said signal generator means in relation to the phase difference between input signals to said phase detector for minimizing the phase difference therebetween.

11. The system of claim 10 in which said means responsive to the output signal from said signal generator means is further operable for generating a vertical sync signal.

12. The system of claim 10 in which said signal generator means is a voltage-controlled oscillator;

said means responsive to the output signal from said signal generator means is a frequency divider circuit;

said detector means is a phase detector; and said means coupled between said detector means and said signal generator means includes filter means for producing a DC signal having an instantaneous amplitude related to the phase difference between the generated horizontal sync signal and the received horizontal sync signal.

References Cited

UNITED STATES PATENTS

| | | | |
|---|---|---|---|
| 2,828,478 | 3/1958 | Johnson | 178—6.6 X |
| 2,854,526 | 9/1958 | Morgan | 179—100.2 |
| 3,414,672 | 12/1968 | Townsend et al. | 178—69.5 |
| 3,426,149 | 2/1969 | McTaggart | 178—69.5 |

ROBERT L. GRIFFIN, Primary Examiner

R. K. ECKERT, Jr., Assistant Examiner

U.S. Cl. X.R.

178—69.5

PO-1050
(5/69)

UNITED STATES PATENT OFFICE
CERTIFICATE OF CORRECTION

Patent No. 3,522,373 Dated July 28, 1970

Inventor(s) Walter H. Bockwoldt

It is certified that error appears in the above-identified patent and that said Letters Patent are hereby corrected as shown below:

Col. 1, line 69, "(Y" should be --(Y)--.
Col. 2, line 5, "decoded" should be --decoder--.
Col. 3, line 26, after "18" insert --relative--;
line 66, "conduits" should be --conducts--.
Col. 5, line 62, after "wherein the" insert --average--.
Col. 6, line 11, "reference" should be --referenced--;
line 23, "forwad" should be --forward--.
Col. 7, line 12, "$f_n$" should be --$f_h$--;
line 16, after "82" insert --. The ÷2 circuit 82--;
line 31, "$f_n$" should be --$f_h$--;
line 64, "flip-flop" should be --flip-flops--.
Col. 8, line 18, "lop" should be --loop--;
line 23, "up" should be --in--;
line 41, "cross" should be --crossing--;
line 50, "tre" should be --the--;
line 52, "$f_v$ generated by the one-shot multivi-" should be --$f_s$ derived from the output of ÷6--;
line 66, "vido" should be --video--;
line 68, "synchronized" should be --synchronizer--.
Col. 9, line 8, "signals" should be --signal--;
line 16, "maintaining" should be --minimizing--;
line 46, after "output" insert --signal--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents